United States Patent [19]

Styron

[11] Patent Number: 4,741,782

[45] Date of Patent: May 3, 1988

[54] PROCESS FOR FORMING A LIGHT-WEIGHT AGGREGATE

[75] Inventor: Robert W. Styron, Marietta, Ga.

[73] Assignee: Resource Technology, Inc., Tucker, Ga.

[21] Appl. No.: 908,787

[22] Filed: Sep. 18, 1986

Related U.S. Application Data

[63] Continuation-in-part of Ser. No. 669,284, Nov. 7, 1984, Pat. No. 4,624,711.

[51] Int. Cl.$^4$ .............................................. C04B 14/00
[52] U.S. Cl. ..................................... 106/309; 106/90; 106/97; 106/122; 106/308 B; 106/308 S
[58] Field of Search ............ 106/90, 97, 122, DIG. 1, 106/308 B, 308 S, 309

[56] References Cited

U.S. PATENT DOCUMENTS

| | | | |
|---|---|---|---|
| 2,987,411 | 6/1961 | Minnick | 106/288 R |
| 3,141,857 | 7/1964 | Sommer | 260/2.5 |
| 3,758,319 | 9/1973 | Ergene | 106/88 |
| 3,814,614 | 6/1974 | Kraemer et al. | 106/97 |
| 3,983,081 | 9/1976 | Dieterich et al. | 260/2.5 AJ |
| 4,097,422 | 6/1978 | Markusch | 260/2.5 AK |
| 4,142,910 | 3/1979 | Kraemer et al. | 106/97 |
| 4,321,243 | 3/1982 | Cornwell et al. | 423/268 |
| 4,336,069 | 6/1982 | Dodson et al. | 106/288 B |
| 4,373,955 | 2/1983 | Bouchard et al. | 106/88 |
| 4,426,456 | 1/1984 | Gillott et al. | 501/84 |
| 4,501,830 | 2/1985 | Miller et al. | 523/401 |
| 4,624,711 | 11/1986 | Styron | 106/308 S |

OTHER PUBLICATIONS

"Lightweight and Foam Products", Cement and Mortar Technology and Additives, Noyes Data Corp., Park Ridge, N.J. (1980).

Perry's Chemical Engineer's Handbook, 5th Ed., McGraw-Hill Book Co., N.Y., N.Y. (pp. 8-61 to 8-64.

*Primary Examiner*—Paul Lieberman
*Assistant Examiner*—Willie J. Thompson
*Attorney, Agent, or Firm*—Killworth, Gottman, Hagan & Schaeff

[57] ABSTRACT

A process is disclosed for forming lightweight aggregate pellets having a density of less than about 60 lbs./ft.$^2$. The first step of the process is to form an admixture which includes fly ash, cement and filler. By weight percent of the admixture formed, the admixture includes greater than 60% fly ash, 1–25% cement and 1–10% filler. Water and a chemical accelerator are added to the admixture in a pelletizing device. By weight percent of the aggregate formed, about 1 to 18% water is added and between about 0 and 3% chemical accelerator is added by weight of the cement used in the admixture. The aggregate pellets are then removed from the pelletizing device and cured with an oxygen containing gas, such as air, at a temperature of less than about 300° F.

20 Claims, No Drawings

PROCESS FOR FORMING A LIGHT-WEIGHT AGGREGATE

CROSS-REFERENCE TO RELATED APPLICATIONS

This application is a continuation-in-part of U.S. application Ser. No. 669,284, filed on Nov. 7, 1984, now U.S. Pat. No. 4,624,711.

BACKGROUND OF THE INVENTION

The present invention relates to a process for producing light-weight concrete products and more particularly it relates to a process for producing a light-weight aggregate for use in the production of light-weight structural products.

Approximately ¾ of the volume of conventional concrete is occupied by aggregates consisting of such materials as sand, gravel, crushed rock, or air-cooled blast-furnace slag. It is inevitable that a constituent occupying such a large percentage of the mass should contribute important properties to both the plastic and hardened product. Additionally, in order to develop special light-weight, thermal and acoustical characteristics, aggregates manufactures specifically to develop these properties in concrete are employed. These aggregates may occupy less than ¾ of the volume in structural concrete and more than ¾ of the volume in masonry units and other applications.

When concrete is freshly mixed, the aggregates really are suspended in the cement-water-air bubble paste. Behavior of this suspension (i.e., the fresh, plastic concrete), for instance, ease of placement without segregation causing rock pockets or sand streaks, is importantly influenced by selection of the amount, type and size gradation of the aggregate. Depending upon the nature of the aggregates employed, a fairly precise balance between the amount of fine-and-course-sized fractions may have to be maintained to achieve the desired mobility, plasticity, and freedom from segregation, all lumped under the general term "workability." Selection of mixture proportions is aimed to achieve optimum behavior of the desired properties.

Aggregates contribute many qualities to the hardened concrete. The strength-giving, binding material holding concrete together results from the chemical union of the mixing water and cement and is, of course, the basic ingredient. However, this hardened cement-water-air bubble paste would, by itself, be a very unsatisfactory building material due to its high cost and volume shrinkage. Unless restrained by contained aggregates, the paste undergoes an intolerable amount of shrinkage upon drying. The exposed portions of such pastes dry out first, and differential shrinkage between the outside and inside portions often results in cracking. The presence of aggregates provides an enormous contact area for intimate bond between the paste and aggregate surfaces. Rigidity of the aggregates greatly restrains volume change of the whole mass. The aggregates should also contribute to workability, volume, stability, unit weight, resistance to destructive environment, strength, and present an acceptable surface texture.

Satisfactory concrete has been made with aggregate consisting of particles of a great variety of individual shapes. Natural aggregate particles which have been subjected to wave and water action over geologic history may be essentially spherical; other broken by crushing may be cubical or highly angular with sharp corners. Of intereset to the concrete technologist is that such changes in shape will be influential in altering the void characteristics of the aggregate. A highly angular coarse aggregate possessing a large void content will demand a greater amount of sand to provide a workable concrete. Conversely, a well-rounded course aggregate tending toward spherical particles will require less sand. Thus a rounded aggregate may contribute to better workability in a concrete mix. It is interesting to note, however, that concretes made with a great disparity in particle shapes at a given cement content will frequently have about the same compressive strength.

As such, it would be desirable to have a light-weight (less than about 60-70 lb/ft$^3$), nearly spherical aggregate compatible with concrete which still retains all of the strength characteristics of natural aggregate particles.

"Lightweight aggregates" of various types have been used for many years, but it is only in the last twenty-five years that they have become an important factor in the concrete industry. Both mineral (inorganic) and vegetable (organic) materials of many varieties have been considered and tested for use as light-weight aggregates. The inorganic or mineral materials are the only ones that have been used to any significant extent.

Various methods have been used to classify light-weight aggregates into general types. These are frequently based on original source as either natural or artificial materials. The artificial aggregates are either by-products of an industrial operation or specially produced by calcining, expanding or sintering. In this classification system, such materials as pumice, scoria, and tuff are natural aggregates. By-product materials include cinders, bottom-ash, and processed by-products. Processed light-weight aggregates may also be produced from clay, shale, slate, perlite, vermiculite, blast furnace slag, and fly ash.

Some of the above materials may be placed in more than one of the groups. For example, pumice may be used either in its original natural state or after heat processing (calcining). Blast furnace slag and fly ash are by-products that have heretofore been processed for use as light-weight aggregates by expanding and sintering, respectively. Clays, shales, and slates are natural materials that are always heat processed during production of light-weight aggregates.

There are basically three A.S.T.M. (American Society for Testing Materials) specifications that cover light-weight aggregates. These specifications are as follows:

1. A.S.T.M. C-330, "Lightweight Aggregates for Structural Concrete"
2. A.S.T.M. C-331, "Lightweight Aggregates for Concrete Masonry Units"
3. A.S.T.M. C-332, "Lightweight Aggregates for Insulating Concrete Of course, it is known that use of such light-weight aggregates, either natural or artificial, produces a "light-weight concrete." A light-weight concrete is a concrete lighter in weight than that usually obtained with "normal weight" aggregates (gravel and crushed stone). Light-weight concrete may be produced in the same manner as conventional concrete except for the use of light-weight aggregates.

The use of fly ash to make light-weight aggregates is known. For example, Minnick, U.S. Pat. No. 2,987,411, discloses a process for making a light-weight aggregate wherein fly-ash is initially mixed with a material such as clay, shale and mixtures thereof. The resulting mixture is then fired in a substantially non-oxidizing atmosphere at temperatures of from about 1500° to 2400° F.

It is also known that light-weight concrete may be produced by adding other light-weight materials such as light-weight structural foam. See, for example, U.S. Pat. Nos. 4,373,955; 4,097,422; 3,983,081; and 3,758,319, which discloses various types of light-weight foamed concretes.

It is further known that various agents can be introduced into a concrete mixture to achieve certain desired properties. For example, Sommer, U.S. Pat. No. 3,141,857 relates to a cellular concrete which is produced by agitating Portland cement with water and a foaming agent (which may be sulfonate containing) and then adding a mineral filler such as sand, gravel or crushed rock. Gilliot et al, U.S. Pat. No. 4,426,456 relates to an improved sulphur concrete which entrains air cells or microspheres in the material to improve its freeze/thaw characteristics. Gilliot discloses that a sulfate surfactant may be used as a gas entraining agent to modify the surface tension of the molten sulphur component of the sulphur concrete. Miller, U.S. Pat. No. 4,501,830 relates to a rapid set light-weight cement product which is produced from a mixture of cement, condensed silica fume, fly ash cenospheres, finely divided silica particles, epoxy emulsion, curing agent, accelerator and water. The silica fume used by Miller can be of the type disclosed by Cornwell et al in U.S. Pat. No. 4,321,243.

Finally, Kraemer Pat. Nos. 4,142,910 and 3,814,614 disclose light construction concretes including lightweight inorganic admixtures compatible with concrete. These admixtures are foamed or bloated to be approximately spherical or ellipsoidal shaped. The admixtures of the Kramer patents include foamed alkali metal silicate glass, foam glass granulates, and expanded or bloated clay. The Kraemer patents, among others, are discussed in the chapter entitled, "Lightweight and Foam Products" in *Cement and Mortar Technology and Additives*, Noyes Data Corp., Park Ridge, N.J. 1980.

While the admixtures of Kraemer have the advantage of producing a light-weight concrete having a dry density of less than about 0.9 kg/dm$^3$ and a 28-day compressive strength of up to about 120 kg/cm$^2$, the foaming or blowing procedure for such inorganic glasses is difficult, requires high temperatures, and can be costly.

Accordingly, the need exists for a more efficient means for producing a lower cost light-weight aggregate containing fly ash.

SUMMARY OF THE INVENTION

The present invention meets that need by providing a process for producing a fly ash containing aggregate which is lightweight, which is compatible in cement and water mixtures, and which has sufficient physical properties to meet the ASTM's specifications for lightweight aggregates. Further, the present invention provides a process for producing this lightweight, fly ash containing aggregate at a low cost.

In accordance with the present invention, a process is disclosed for forming light-weight aggregate pellets having a density of less than about 60 lbs./ft.$^3$. To produce the aggregate, an admixture is formed comprising, by approximate weight percent of the admixture: (a) greater than 60 percent fly ash, (b) 1–25% cement, (c) 1–10% filler, and (d) 0–14% surfactant foam. In a pelletizing device, water and a chemical accelerator are added to the admixture to form aggregate pellets of a predetermined size range. To the mixture is added 1–18% by total aggregate weight of a water/accelerator fluid. That fluid is preferably made up of 0.5–16% water by total aggregate weight and 0–3% chemical accelerator based on the amount of cement present. The aggregate pellets are drawn off from the pelletizing device and are then cured with an oxygen-containing gas at a temperature less than about 300° F.

A wide variety of chemical accelerators can be used in the process. Preferred accelerators include calcium, chloride, calcium formate, calcium nitrite, triethanolamine, calcium carbonate and silica fume extract. Most preferred is a combination accelerator comprising an aqueous mixture of calcium formate, calcium nitrite, and triethanolamine, and calcium aluminate.

The curing step in the process is preferably done at ambient temperatures by allowing the pellets to air dry. However, heated air can be forced past the pellets to accelerate the cure and to introduce oxygen to the pellets.

One feature of the present invention is that fly ash is utilized to produce a strong, light-weight aggregate. This feature has several advantages. One advantage is that fly ahs, an industrial by-product which usually represents a solid waste disposal expense to the producer, is utilized for a beneficial purpose. As a waste material formed as a by-product of the combustion of coal, fly ash is typically disposed of in landfills. By utilizing the fly ash in a building material, the need for disposing the fly ash in a landfill is obviated.

Another advantage obtained by the present invention is that the aggregate produced is strong enough to meet current A.S.T.M. standards for light-weight aggregates for use in various building materials. These A.S.T.M. standareds are referred to above. Although the aggregates produced by the present process are strong enough to meet the A.S.T.M. standards, they are light enough to be classifiable as light-weight aggregates. Lightweight aggregates (those weighing less than 70 lbs. per cubic foot and more preferably less than 60 pounds per cubic foot) are desirable in a wide range of applications such as concrete masonry units, structural concrete, and insulating concrete.

Another feature of the present invention is that fly ash containing light-weight aggregates are produced which can be cured at ambient temperatures, and do not need to be fired. This feature has the advantage of reducing the energy costs required to manufacture the aggregate. These energy costs of firing the aggregate to cure them (typically at temperatures of between about 1500° to 2400°) can be quite substantial. Accordingly, the cost savings produced by obviating the need for firing the aggregates is also quite substantial.

DETAILED DESCRIPTION OF THE PREFERRED EMBODIMENTS

The preferred process of the present invention for forming light-weight aggregate pellets having a density of less than about 60 lbs./ft.$^3$ comprises the following steps. The first step is to form an admixture. The admixture comprises, by approximate weight percent of the admixture formed: (a) greater than 60% fly ash, (b) 1–25% cement, and (c) 1–15% filler. It may also include: (d) 0–14% surfactant foam.

Most preferred is the use of greater than 60 percent class C or class F fly ash, between 1–12% Portland cement, between 0 and 3% sulfate surfactant foam, and between 1-6% silica fume dust as a filler.

The physical mixing of the fly ash, cement, filler, and surfactant can be achieved by a wide variety of mixing means. For example, an auger type mixer satisfactorily mixes the components of the admixture.

The admixture is placed in a pelletizing device, such as a tumbling agglomerator. Examples of tumbling agglomerators are shown at pages 8-61 to 8-64 of Perry's *Chemical Engineer's Handbook*, 5th Ed, McGraw-Hill Book Company, New York, N.Y. Preferred is a disk or pan agglomerator also referred to herein as a pan pelletizer, available from Ferro-Tech, Wyandotte, Mich. If surfactant foam is to be added the pan pelletizer should be adapted for the addition of the surfactant foam through a central applicator so that the foam can be folded in gently with the other ingredients. Preferably the surfactant foam is added to the admixture at the rate of 0.33 $ft^3$/min to 3.12 $ft^3$/min to admixture which is being placed in the pan pelletizer at the rate of from 33 lbs/min to 833 lbs/min.

Water and chemical accelerators are added in the pelletizing device in quantities of between about 0.5 and 16% water (by total aggregate weight) and 0-3% of the chemical accelerator (by weight of the cement) to form aggregate pellets of a predetermined size range. Preferably, approximately 16% hot water is used, and the chemical accelerator of choice is a mixture of calcium formate, calcium nitrite, triethanolamine, and calcium aluminate in the preferred amount of 0.5-2% by weight of cement present.

The water and accelerator are preferably continuously sprayed into the admixture in the pan pelletizer. The preferred spray rate for the water/accelerator fluid is approximately 0.07 gal/min to 1.91 gal/min to the admixture which is being placed in the pan pelletizer at the rate of 33 lb/min to 833 lb/min.

Pellets are then drawn off the pelletizing device. The pellets formed in the pan pelletizer may vary in size from 1½ screen size to 200 mesh. The size and gradation of the pellets are influenced by the feed rate of dry mix and liquid mixture, the angle of the pan, the speed at which the pan rotates, and the depth of the pan.

The uncured aggregate pellets are discharged from the pan onto a conveyor for transport to a curing station. As the pellets formed by the process of the present invention are cured by oxygen, and as the pellets need not be fired, the curing station can comprise nothing more than an outdoor or indoor pile of uncured aggregate. If desired, the uncured aggregate can be placed in a drying bed wherein ambient air is forced past the pellets to accelerate the curing process. Alternately, slightly heated air (air at temperatures less than 300° F.) can be forced past the uncured pellets to accelerate the introduction of oxygen to the pellets and thereby accelerate the curing process. Although the pellets can be fired at conventional firing temperatures (1500°-2400° F.), there is no requirement to do so, as the pellets will cure at ambient temperatures.

The curing time required for the pellets will vary, depending on such factors as temperature, whether or not air is forced past the pellets, humidity, the configuration of the curing station and the size of the aggregate pellets. As will be appreciated, the pellets will cure faster at high temperatures, lower humidities, by air being forced past the pellets, an if the curing station is configured to maintain separation of the pellets to facilitate the contact of air with the pellets.

The pellets are cured long enough to permit the pellets to cure sufficiently to acquire sufficient compressive strength to meet relevant ASTM standards for the particular application to which the pellets will be placed. After the pellets have cured sufficiently, they can be passed through a screen for separation based on size, and then shipped to a customer for utilization.

A wide variety of mixtures can be used to form suitable aggregates. The amount of any one particular component and the particular type of component chosen are dependent on a variety of factors.

One factor influencing the choice of component used in the desired density and other physical properties of the aggregate pellets to be formed. The choice of the type of filler component to be utilized is largely dependent upon the desired density of the end pellet. Additionally, the choice of whether to use a surfactant, and the amount of surfactant used is dependent upon the desired density of the end product.

A second factor influencing the choice of components is availability. This factor plays a role especially in the choice of fillers.

A third factor influencing choice of components is the cost of the various components. As can be appreciated, it is desirable to use lower cost components when possible. However, higher cost components may be desirable when these higher cost components impart a desirable characteristic to the product, or facilitate the process.

A fourth factor in deciding both the type and amount of components is the interaction of a particular component with the other components used in the process. For example, the primary function of the chemical accelerator is to interact with the cement, to cause the cement to bind with the fly ash. Therefore, the amount of chemical accelerator used is largely dependent on the amount of cement used. Additionally, the amount of cement used is dependent upon the amount and type of fly ash used. As class C fly ash is more pozzolanic and in some cases more cementitious than class F fly ash, more cement is used in processes wherein the aggregate is formed from class F fly ash than processes utilizing class C fly ash. Thus, as the amount of cement used is dependent upon the type of fly ash, and as the amount of accelerator used is dependent upon the amount of cement used, the amount of accelerator used is also dependent upon the type of fly ash used.

a. The Fly Ash Component

The main component used in the process of the present invention is fly ash. Fly ash is a fine, essentially non-combustible particulate refuse. Fly ash is primarily produced as the by product of the combustion of coal in power plants, steel mills and other coal burning facilities. Fly ash differs from bottom ash in that fly ash particles tend to comprise smaller particles than bottom ash. The primary component of fly ash is alumina and iron and is encapsulated by silica. The alumina helps to impart a cementitious property to fly ash. Although some fly ashes have cementitious properties it is not defined as a cement.

There are two major classes of fly ash which are of interest in the present invention. These classes are class C fly ash and class F fly ash.

Class C fly ash is formed as the combustion by-product of western sub-bituminous coal, such as the sub-bituminous coal from the Powder River Basin of Wyoming and Idaho. Class C fly ash will ordinarily be such that less than about 34% is retained in a 325 mesh sieve (U.S. series) as tested on A.S.T.M. test procedure C-311. It may typically show the following components on analysis.

| Components | Proportion |
| --- | --- |
| $SiO_2$ | 20-40 wt. % |
| $Al_2O_3$ | 10-30 |
| $Fe_2O_3$ | 3-10 |
| MgO | 0.5-8 |
| $SO_3$ | 1-8 |
| $TiO_2$ | 0.5-2 |
| C | 0.5-2 |
| $H_2O$ | 0.33-3 |
| CaO | 10-32 |
| $K_2O$ | 0.5-4 |
| $Ni_2O$ | 0.5-6 |

One distinguishing feature of class C fly ash is its high lime (calcium) content. This high lime content contributes substantially to the propensity of class C fly ash to bind readily when mixed with water. The propensity to bind when mixed with water is referred to as a pozzolanic property. The high lime content of class C fly ash makes it rather pozzolanic and in some cases cementitious.

The impact of this pozzolanic property of class C fly ash on the process of the present invention is to lower the amount of cement and accelerator necessary to form the aggregate when class C fly ash is used. For example, the process of the present invention generally requires that only about a 1 to 8% by admixture weight of cement, and a less than 2% (by weight of cement) of accelerator be used when class C fly ash is employed.

Class F fly ash is formed as the combustion by-product of eastern bituminous coal. Class F fly ash typically contains less lime (calcium oxide) than class C fly ash. This relatively lower amount of lime in class F fly ash causes class F fly ash to be considerably less cementitious than class C fly ash. Thus, the use of class F fly ash to form the aggregate of the present invention requires the use of considerably more cement and accelerator than the production of aggregate from class C fly ash. The additional cement and accelerator are used as binders to compensate for the relatively low binding properties of class F fly ash (as compared to class C fly ash).

The percentage of fly ash used is variable. However, as one of the objects of the present invention is to find a means for utilizing fly ash, it is desirable to utilize as much fly ash as possible in forming the aggregate. The aggregate formed by the process of the invention comprises greater than 60% fly ash, and preferably between about 60% and 85% fly ash in the admixture. The limitations on the amount of fly ash which can be used (as a percentage of the admixture) are imposed primarily by the binding properties of fly ash. It will be appreciated that the greater the amount of binder material (principally cement and accelerator) required to bind the fly ash efficiently, the smaller a percentage of fly ash that will be used. In this regard, it will also be appreciated that as class C fly ash has a greater binding propensity than class F fly ash, class C fly ash containing aggregate can utilize a greater percentage of fly ash than aggregate formed from Class F fly ash.

Another factor which impacts the percentage of fly ash in the final aggregate is the desired density of the final aggregate produced. The applicants have found that one method for decreasing the weight of the aggregate produced is to substitute light-weight filler materials for fly ash to some extent. Thus, it may be advantageous to decrease the fly ash percentage and increase somewhat the filler percentage to achieve the desired low density in the final aggregate. For example, even though the admixture can contain up to about 85% class C fly ash, it may be desirable to reduce the percentage of fly ash to about 78-80%, and to utilize approximately 5% of a light-weight filler such as cenospheres, or 4% of silica fume or perlite to achieve a desired density of 55 lbs./ft.$^3$ in the final aggregate.

b. The Cement Component

The purpose of the use of cement in the process of the present invention is to supplement the binding properties of the fly ash. The preferred cement used is a Type 1 or Type III Portland Cement. As the primary purpose of the cement is to supplement the binding properties of the fly ash, it will be appreciated that the amount of cement used is proportional to the amount of supplementation needed by the particular fly ash. Thus, less cement is needed when preparing aggregate from class C fly ash than when preparing aggregate from class F fly ash, due to the higher binding propensity of class C fly ash. For example, it has been found by applicant that the amount of cement used in an aggregate formed from class C fly ash can be as low as between about 1 and 5%, whereas aggregate formed solely from Class F fly ash often requires between about 8 and 25% cement, depending upon the particular type of class F fly ash being used.

As the particular proportions of components of class C and class F fly ash will vary, it can be expected that variations in the amount of cement used will occur, depending upon the particular batch of class C or class F fly ash being utilized. Additionally, the amount of cement utilized when aggregates are formed from mixtures of class C and class F fly ash will likely fall somewhere between the ranges set forth for class C fly ash and class F fly ash.

c. The Filler Component

One reason for using a filler is that the filler can serve as a binder and thereby enhance the strength of the aggregate formed. Another purpose for using a filler is to reduce the density of the aggregate formed. One filler used by applicant, silica fume dust, can serve both purposes. The applicant has found that the addition of silica fume dust in the range of between about one and twenty-five percent is effective in accelerating the cure time of the aggregate, and also increases the strength of the aggregate pellets. However, the use of silica fume dust is not generally recommended at above a 10% quantity because of the adverse effect of the bulk density of the silica fume dust with Portland cement. It has been found by applicant that silica fume dust rapidly accelerates the hydration of the Portland cement, and can produce desirable flash settling conditions.

In addition to increasing the strength of the aggregate pellets so formed, the silica fume dust also helps to reduce the aggregates' density. For example, in one test, the applicant found that the aggregates formed by the process of the present invention from class C fly ash without silica fume had a density of approximately 75-78 lbs/ft$^3$. When silica fume was added in a quantity of approximately 1-5% of the admixture, the density of the aggregate formed was reduced to 55 pounds per cubic foot.

Similar results were found in tests utilizing aggregates made from class F fly ash. The applicant found that an aggregate made from class F fly ash without silica fume had a density of between about 65 and 70 lbs./ft.$^3$. However, when aggregate was made utilizing approximately 1-4% silica fume, the resulting aggregate's density was between about 48 and 52 lbs./ft.$^3$.

Another filler which can be utilized is incinerated sewage sludge. Although incinerated sewage sludge is not believed to enhance the strength of the aggregrate formed in the present invention, it does help reduce the density. For example, the applicant formed an aggregate utilizing approximately 7% of incinerated sewage sludge having a density of approximately 30 pounds per cubic foot. Even though very light, the aggregate so formed was still strong enough to satisfy the relevant A.S.T.M. testing requirements. The percentage of incinerated sewage sludge which can be used as a filler is between about 1 and 9% of the admixture and preferably between about 1 and 7%.

Cenospheres are another useful filler. Cenospheres are hollow microspheres that are recovered from power plants, usually as floaters. They are usually glass spheres having a density of generally about 15 and 20 pounds per cubic foot. Cenospheres not only help to reduce the density of the aggregate, but also contribute to the strength of the aggregate. For example, a pelletized, cenosphere containing aggregate was produced having a unit weight of between about 25 and 38 lbs/ft$^3$. It is believed that cenosphere containing aggregates will have particular utility in those applications which must withstand high temperatures such as firebrick and linings for furnaces and reactors. For example, the applicant was able to produce aggregate formed by the process of the present invention which included cenospheres of various sizes, and other forms of microcenospheres, fly ash and fondue cement (refractory cement). The aggregate so produced retained its strength and integrity even at temperatures up to about 3,000° F. Cenospheres can comprise between 1 and 5% of the weight of the admixture, and, when used preferably comprise between 2 and 3%.

Perlite is another preferred filler. Perlite is a glassy volcanic rock which expands upon heating to give a product of low bulk density, i.e. between 2 and 20 lbs. per cubic foot. Expanded perlite has low thermal conductivity, high resistance to fire, and low sound transmission. Perlite can comprise between 1 and 5% of the weight of the admixture, and, when used preferably comprises between 2 and 3%.

Other fillers which can be used include diatomaceous earth, fullers earth, kaolin, kiln dust (cement and lime), perlite, pyrophyllite, talc, and ground vermiculite.

d. The Surfactant Foam Component

Although it is not necessary to utilize a surfactant foam in the process of the present invention, a surfactant foam can be used to help reduce the density of the aggregate. The surfactant aids in the reduction of the density of the aggregate by promoting the entrainment of gas bubbles in the aggregate. The surfactant foam may be produced by the introduction of air under pressure into a further surfactant, preferably a sulfate surfactant. The surfactant foam may be an anionic, cationic, or nonionic surfactant. Preferably, however, the surfactant is an anionic surfactant in the form of an ammonium or calcium salt of a sulfate surfactant. Examples of such sulfates surfactants are: ammonium alkyl ether sulfate, ammonium salts of ethoxylate sulfate, calcium alkylaryl sulfonate, ammonium lauryl sulfate, monoethanolamine lauryl sulfate, diethanolamine lauryl sulfate, triethanolamine lauryl sulfate, isopropanolamine lauryl sulfate, ammonium lauryl ether sulfate, diethanolamine lauryl ether sulfate, isopropylamine salt of alkyl benzene sulfonic acid, amine or ammonium salts of dodecyl benzene sulfonic acid, ammonium salts of oxidized oleic acid, ammonium salts of sulfated nonyl-phenol ethoxylate, calcium dodecyl benzene sulfonate, ammonium myristyl ether sulfate, ammonium myristyl sulfate, triamine lauryl sulfate, alkanol amino lauryl sulfate, acyl amino polyglycol ether sulfate.

Preferred among these is ammonium salts of dodecyl benzene sulfonic acid. It is theorized that the receptive sulfate ion enhances the fly ash strength gaining properties by reacting to form an alkali sulfate.

Added to the sulfate surfactant may be a small amount i.e., up to 3 parts weight percent, of a non-wetting agent such as glycerin, mineral oil or mixtures thereof. As mentioned, the non-wetting agent is added to stabilize the foam and reduce its tendency to collapse while being folded in with the fly ash.

The sulfate surfactant/non-wetting agent mixture in water (i.e. 0-3% surfactant/non-wetting agent, remainder water) is foamed using a foam generator which is capable of introducing air under pressure (i.e. from a compressor, for example) in the range of 0-150 psi. The resulting foam is added to the fly ash at the rate of 1 to 14, and more preferably 10-14 parts per hundred in the admixture.

e. The Water and Chemical Accelerator Components

The water is used to initiate the hydration reaction of the cement and fly ash to cause the fly ash and cement to bind together. Additionally, the water is used as a carrier for the chemical accelerator. A water/accelerator fluid is utilized in the process of the present invention of forming aggregate preferably in quantities of between about 1 and 18%, and most preferably at about 16% by weight of the total aggregate.

The chemical accelerator is used primarily to accelerate and foster the curing of the cement used in the present process. The amount of chemical accelerator used can be between about 0 and 3%, and is preferably about 2% (by the weight of the cement).

As stated above, the amount of accelerator used is largely dependent upon the amount of cement used. As the primary purpose of the accelerator is to accelerate the curing of the cement, it will be appreciated that the use of a greater amount of cement requires the use of a greater amount of chemical accelerator. Thus, if the quantity of cement used is between about 1 and 5% of the admixture, (such as with class C fly ash) the amount of accelerator used should be between about $\frac{1}{2}$ and 2% of cement. Conversely, if the quantity of cement used approximates 25% of the weight of the aggregate, a quantity of accelerator between about 2 and 3% of the weight of the cement should be used.

Various different types of chemical accelerators were investigated by the applicant. Among those accelerators investigated were calcium chloride ($CaCl_2$); calcium formate ($Ca(OOCH)_2$); calcium nitrite ($Ca(NO_2)_2 \cdot H_2O$); triethanolamine ($(HOCH_2CH_2)_3N$); potassium carbonate ($K_2CO_3$); and calcium carbonate ($Ca_2CO_3$).

An extensive investigation was also conducted into a combination accelerator which comprises an aqueous combination of calcium formate, calcium nitrite, triethanolamine, calcium aluminate and inert additives such as color and perfume. The applicants found that the above five components could be combined in the ranges set forth below to form a good combination accelerator:

| | |
|---|---|
| calcium formate | 1 to 15% |
| calcium nitrite | 1 to 32% |
| triethanolamine | 1 to 10% |
| calcium aluminate | 1 to 10% |
| color and perfume | 0 to 0.3% |
| water | remainder |

Applicants also found an optimum combination accelerator to have the following proportions:

| | |
|---|---|
| calcium formate | 13% |
| calcium nitrite | 25% |
| triethanolamine | 5% |
| calcium aluminate | 1% |
| color and perfume | .01% |
| water | remainder |

It was found by applicants that the above optimum accelerator could be used in a range between about 0 and 3% (by weight percent of the cement). Expressed in terms of total aggregate weight the optimum accelerator comprises preferably between 0.0025 and 0.75% of the weight of the final aggregate.

An additional accelerator which can be used in lieu of the accelerators set forth above is a silica fume extract accelerator. Silica fume extract accelerator is produced by mixing silica fume dust with water, raising the pH to between approximately 10 and 12, allowing the silica fume dust and water mixture to settle for 24 hours, and collecting the supernatant. It is estimated that the supernatant can be between 25 and 50% of the originally added silica fume dust. The extract of silica fume dust proves to be an excellent accelerator for Portland cement and other pozzolanic materials. Particularly, it rapidly accelerates the setting of class C self-hardening fly ash. A preservative, i.e. germicide, may be added to the extract to lengthen its shelf life.

The following non-limiting examples are illustrative.

EXAMPLE 1

An aggregate was produced utilizing the process of the present invention in a pilot plant. The pilot plant consisted of a hopper into which the mixed fly ash, cement and filler (here silica fume dust) components were placed. A screw conveyer (augur) system was utilized to transport the fly ash cement silica fume admixture to a holding hopper. The screw conveyor also served the purpose of further mixing the cement, fly ash and silica fume dust. From the holding hopper, the admixture was directed into a rotary feeder, and then into a pan pelletizer. In the pan pelletizer, the accelerator and water were added by spraying. Pellets were formed in the pelletizer and were directed onto a conveyor for transportation to a stock pile for curing by ambient air. The aggregate of Example 1 includes the following components:

84% admixture comprising:
 86% class F fly ash from Baltimore Gas & Electric
 7% Type 1 Portland cement
 7% silica fume dust To this was added 16% water and 0.0025% of a combination accelerator comprising:
 14% calcium formate
 12% calcium nitrite
 2% triethanolamine
 1% calcium aluminate
 71% water Strong aggregate pellets were produced from this mixture having a density of 55 lbs/ft$^3$. As the incoming fly ash from Baltimore Gas & Electric had a density of 68 lbs./ft.$^3$, the above example provided not only a strong aggregate but also an aggregate having a density reduced sufficiently to classify it as a lightweight aggregate.

EXAMPLE 2

An aggregate was made utilizing the process of the present invention in the pilot plant described in Example 1. The aggregate of Example 2 contained the following components:

84% Admixture comprising:
 85% class F fly ash from Del Marva Power Company
 12% cement
 3% silica fume extract To this was added 16% water and 0.0025% combination accelerator of Example 1.

The high carbon content of the Del Marva Power Company fly ash posed some problem in the formation of the pellets, thus necessitating a relatively higher cement content than the aggregate of Example 1.

EXAMPLE 3

An aggregate of the present invention was produced in the pilot plant described in Example 1, having the following components:

84% Admixture comprising:
 86% class F fly ash from Williams Brothers, Atlanta
 7% Type 1 Portland cement
 7% silica fume dust To this was added 16% water and 0.0025% of the combination accelerator of Example 1.

This blend produced a suitably strong fly ash having a unit weight of 55 lbs./ft.$^3$

EXAMPLE 4

An aggregate was produced by the process of the present invention utilizing the pilot plant described in Example 1, and having the following components:

84% Dry mix comprising:
 88% class C fly ash
 4% Type 1 Portland cement
 8% silica fume dust To this was added 16% water and 0.0025% accelerator as in Example 1.

This class C fly ash produced a suitably strong aggregate having a density of 55 lbs./ft.$^3$

EXAMPLE 5

An aggregate was produced according to the process of the present invention utilizing the pilot plant described in Example 1, and having the following components:

84% Admixture comprising:
 91% class F fly ash from Williams Brothers, Atlanta
 1% silica fume dust
 8% cement To this was added 16% water and 0.0025% of the combination accelerator of Example 1.

The aggregate of Example 5 was similar to the aggregate of Example 1 in that both Example 5 and Example 3 utilized fly ash from Williams Brothers, Atlanta, producing an aggregate having a density of 47 lbs./ft.$^3$ A relatively large quantity of the aggregate of Class 5 was produced and utilized to form a concrete mix. The concrete mix contained the following components in approximately the below listed quantities.

630 lbs. of the fly as aggregate of Example 5
189 lbs. cement
500 lbs. sand
 300 lbs. of granite powder A compressive strength test was performed on 8-inch by 8-inch by 16-inch concrete masonry units produced from the above mentioned concrete. It was found that the compressive strength of the block, was 1040 lbs after one day per square inch; 1310 lbs. per square inch at 15 days; and 1,380 lbs. per square inch at 28 days.

The test was considered a resounding success, far surpassing the generally accepted minimum strength requirements for concrete masonry units.

The aggregate pellets of Example 6 were also checked for gradation utilizing an ASTM C-136 sieve analaysis. The results are as follows:

| Sieve | Percent Passing | Specification |
| --- | --- | --- |
| 1/2 | 100 | 100 |
| 3/8 | 99 | 90–100 |
| 4 | 83 | 65–90 |
| 8 | 49 | 35–65 |
| 16 | 31 | — |
| 30 | — | — |
| 50 | 19 | 10–25 |
| 100 | 15 | 5–15 |

Although the accelerator used in Examples 1–5 above was a combination accelerator, aggregate was made using each of the following materials individually at a dosage rate of between 0.005% and 3.0% of the cement present, along with 16% water.
 calcium formate
 calcium nitrite
 calcium chloride
 triethanolamine
 potassium carbonate
Hot water alone, at the weight of 16% of the total aggregate, was also used.

All were found to produce suitable aggregates.

Having described the invention in detail and by reference to preferred embodiments thereof, it will be apparent that modifications and variations are possible without departing from the scope of the invention defined in the appended claims.

What is claimed is:

1. A process for forming light-weight aggregate pellets having a density of less than about 60 lbs./ft.$^3$ comprising:
 (a) forming an admixture comprising, by weight-percent of said admixture, about
  greater than 60% fly ash,
  1 to 25% cement, and
  1 to 10% filler selected from the group consisting of cenospheres, silica fume dust, and perlite,
 (b) in a pelletizing device, adding to said admixture, by weight percent of the total aggregate, about 1 to 18% water, and
  0 to 3% (by weight of the cement percent) chemical accelerator to form aggregate pellets of a predetermined size range,
 (c) removing said aggregate pellets from said pelletizing device, and
 (d) curing said aggregate pellets with an oxygen containing gas at a temperature less than about 300° F.

2. The process of claim 1 wherein said fly ash comprises a class F fly ash.

3. The process of claim 1 wherein said fly ash comprises a class C fly ash.

4. The process of claim 1 wherein said admixture includes between about 65% and 80% class F fly ash and about 8 and 25% of said cement.

5. The process of claim 4 wherein said aggregate pellets include between about 2 and 3% of said chemical accelerator based on the weight of the cement present.

6. The process of claim 1 wherein said fly ash comprises a shelf hardening fly ash formed in the combustion of sub-bituminous coal from the Powder River Basin.

7. The process of claim 1 wherein said admixture includes between about 60% and 85% class C fly ash, and about 1 to to 8% cement.

8. The process of claim 7 wherein said aggregate pellets include between about 0.5 and 2% chemical accelerator based on the weight of the cement present.

9. The process of claim 7 wherein the step of forming an admixture includes the step of adding a sulfate surfactant in a quantity of between about 1 and 14% by weight of the admixture.

10. The process of claim 9 wherein said sulfate surfactant is selected from the group consisting of ammonium alkyl ether sulfate, ammonium salts of ethoxylate sulfate, calcium alkylaryl sulfonate, ammonium lauryl sulfate, monoethanolamine lauryl sulfate, diethanolamine lauryl sulfate, triethanolamine lauryl sulfate, isopropanolamine lauryl sulfate, ammonium lauryl ether sulfate, diethanolamine lauryl ether sulfate, isopropylamine salt of alkyl benzene sulfonic acid, amine or ammonium salts of oxidized oleic acid, ammonium salts of sulfated nonyl-phenol ethoxylate, calcium dodecyl benzene sulfonate, ammonium myristyl ether sulfate, ammonium myristyl sulfate, triamine lauryl sulfate, alkanol amino lauryl sulfate, acyl amino polyglycol ether sulfate.

11. The process of claim 1 of wherein said filler comprises a mixture of silica fume dust and an additive selected from the group consisting of incinerated sewage sludge, cenospheres, perlite, diatomacious earth, fullers earth, kaolin, kiln dust, pyrophylite and ground vermiculite.

12. The process of claim 11 wherein said filler comprises, by weight of the admixture, between about 1 and 5% silica fume dust and between about 0.5 and 12% additional filler.

13. The process of claim 12 wherein said additional filler is selected from the group consisting of incinerated sewage sludge, cenospheres, perlite, diatomaceous earth, fuller's earth, kaolin, kiln dust, pyrophylite, talc and ground vermiculite.

14. The process of claim 1 wherein said accelerator is selected from the group consisting of calcium chloride, calcium formate, calcium nitrate, triethanolamine, potassium carbonate, calcium carbonate, calcium aluminate and mixtures thereof.

15. The process of claim 1 wherein said accelerator comprises an aqueous mixture of calcium formate, calcium nitrate, triethanolamine, and calcium aluminate.

16. The process of claim 15 wherein said accelerator mixture comprises, by weight percent of the accelerator mixture, 1-15% calcium formate, 1-32% calcium nitrite, 1-10% triethanolamine, 1-10% calcium aluminate, 0-0.3% color and perfume, and the remainder water.

17. The process of claim 1 wherein said pellets are cured by air drying said pellets at an ambient temperature.

18. A process for forming lightweight aggregate pellets having a density of less than about 60 lbs./ft.$^3$ comprising:

(a) forming an admixture comprising greater than 60 parts fly ash, 1 to 25 parts cement, and 1 to 10 parts of a silica fume dust filler, (b) in a pelletizing device, adding to said admixture about
 1 to 18 parts water, and
 0.0025-0.75 parts accelerator to form aggregate pellets of a predetermined size range, (c) removing said aggregate pellets from said pelletizing device, and (d) curing said aggregate pellets with an oxygen containing gas at a temperature less than about 300° F.

19. The process of claim 18 wherein said admixture further includes 1-14 parts sulfate surfactant foam.

20. The product produced by the process of claim 1.

* * * * *